United States Patent
Laue

(10) Patent No.: US 8,171,280 B2
(45) Date of Patent: May 1, 2012

(54) METHOD OF RUNNING MULTIPLE OPERATING SYSTEMS ON AN X86-BASED COMPUTER SYSTEM HAVING A DEDICATED MEMORY REGION CONFIGURED AS A DO NOT USE REGION

(76) Inventor: Matthew Laue, Los Gatos, CA (US)

( * ) Notice: Subject to any disclaimer, the term of this patent is extended or adjusted under 35 U.S.C. 154(b) by 406 days.

(21) Appl. No.: 12/545,130

(22) Filed: Aug. 21, 2009

(65) Prior Publication Data

US 2010/0325405 A1    Dec. 23, 2010

Related U.S. Application Data

(60) Provisional application No. 61/219,008, filed on Jun. 22, 2009.

(51) Int. Cl.
*G06F 9/00* (2006.01)
*G06F 13/00* (2006.01)

(52) U.S. Cl. .............................. 713/2; 713/153; 713/173

(58) Field of Classification Search ........................ 713/2
See application file for complete search history.

(56) References Cited

U.S. PATENT DOCUMENTS

| | | | | |
|---|---|---|---|---|
| 6,314,501 B1 * | 11/2001 | Gulick et al. | ................. | 711/153 |
| 6,633,916 B2 * | 10/2003 | Kauffman | ..................... | 709/229 |
| 6,711,700 B2 * | 3/2004 | Armstrong et al. | ............. | 714/23 |
| 6,725,317 B1 * | 4/2004 | Bouchier et al. | ............. | 710/312 |
| 7,603,338 B2 * | 10/2009 | Dandekar et al. | ..................... | 1/1 |
| 2002/0029301 A1 * | 3/2002 | Toda | ............................. | 709/319 |
| 2007/0239616 A1 * | 10/2007 | Walline et al. | ................. | 705/59 |

* cited by examiner

*Primary Examiner* — Suresh Suryawanshi

(74) *Attorney, Agent, or Firm* — Buchanan Ingersoll & Rooney PC

(57) ABSTRACT

Two or more distinct operating systems (OSs) are loaded simultaneously and run on an x86 computer system. Each OS is booted serially and in such a way that the OS resides in a separate memory footprint than the other OSs by partitioning the memory map. The partition of the memory map includes a low memory region, dedicated memory partitions for storing each OS, and dedicated regions for storing shadows of the low memory region and the ACPI for each OS. Switching between the two or more resident OSs is performed by sleeping the current OS and then resuming the desired OS using the shadow previously stored for the desired OS. None of the resident OSs require any modification in order to run in this fashion.

27 Claims, 4 Drawing Sheets

METHOD OF RUNNING MULTIPLE OPERATING SYSTEMS ON AN X86-BASED COMPUTER SYSTEM HAVING A DEDICATED MEMORY REGION CONFIGURED AS A DO NOT USE REGION

CROSS-REFERENCE TO RELATED APPLICATION

This application claims priority to U.S. Patent Provisional Application No. 61/219,008, filed Jun. 22, 2009, which is incorporated herein by this reference in its entirety.

BACKGROUND OF THE INVENTION

1. Field of the Invention

Embodiments of the present invention relate generally to operating systems for x86-based computer systems and, more particularly, to running multiple operating systems on a single x86-based computer system.

2. Description of the Related Art

The use of two or more different operating systems (OSs) on a single computer system, such as a Windows-based and a Linux-based operating system (OS), is often desirable for users of computer systems. Techniques known in the art that allow multiple OSs to be run on the same computer system include emulation, virtualization, and combinations of both.

In emulation-based techniques, one OS, referred to as a guest OS, is run as an application of another OS, which is known as the host OS. A significant disadvantage of emulation-based techniques is a reduction in speed. In addition, the guest OS does not have full control of any real hardware. In a virtualization approach, the guest OS is allowed to run directly on the CPU for some period of time, but has the disadvantage of requiring hardware support.

Accordingly, there is a need in the art for a method that enables running multiple operating systems on a single computer system without the disadvantages inherent with emulation and virtualization approaches.

SUMMARY OF THE INVENTION

One or more embodiments of the invention provide a method that allows two or more distinct operating systems to be loaded simultaneously on an x86 computer system. In one embodiment, for example, a version of Windows and Linux may be loaded and run on a single computer system. Each OS is booted serially and in such a way that the OS resides in a separate memory footprint than the other OSs by partitioning the memory map. The partition of the memory map includes a low memory region, dedicated memory partitions for storing each OS, and dedicated regions for storing shadows of the low memory region and the Advanced Configuration and Power Interface (ACPI) information for each OS. Switching between the two or more resident OSs is performed by sleeping the current OS and then resuming the desired OS using the shadow previously stored for the desired OS. None of the resident OSs require any modification in order to run in this fashion.

One advantage of the disclosed method is that multiple OSs can be loaded and run on a single x86-based computer without the lower performance associated with emulation. Another advantage of the disclosed method is that hardware support is not required.

In accordance with an exemplary embodiment, on an x86-based computer system, a method of running multiple operating systems comprises: partitioning a memory map on the x86-based computer system, the memory map comprising: a first operating system (OS) memory partition; a second OS memory partition; and a dedicated memory region; loading a first OS in the first OS memory partition; loading a second OS in the second OS memory partition; and booting up the first and second OSs.

In accordance with another exemplary embodiment, on single x86-based computer system, a method of running multiple operating systems comprises: loading a pre-kernel onto the single x86 based computer system; and performing the following steps with the pre-kernel: partitioning a memory map that comprises a low memory region, a first operating system (OS) memory partition, a second OS memory partition, and a dedicated memory region; loading a first OS in an unreserved memory region for the first OS; loading a second OS in the second OS memory partition; and booting up the first OS to begin normal operation of the x86-based computer system.

In accordance with a further exemplary embodiment, on a single x86-based computer system with a first operating system residing in a first OS memory partition and a low memory region, a method of running multiple operating systems comprises: storing a shadow of the first OS in a first OS shadow region; and restoring a shadow of a second OS from a second OS shadow region.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
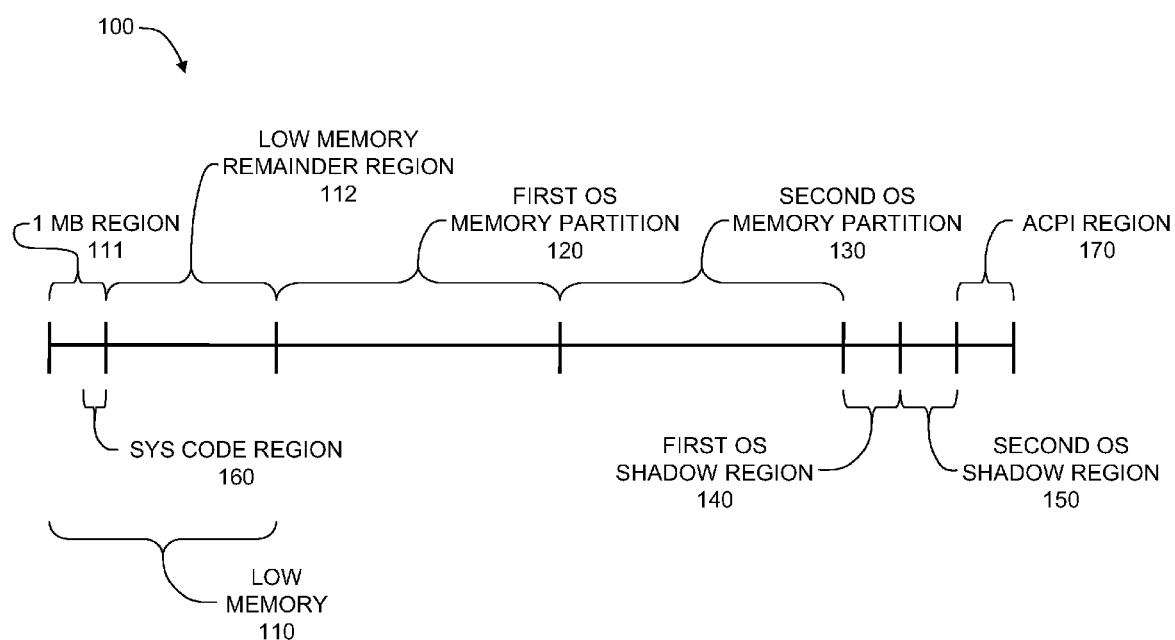
FIG. 1 is a graphical representation of a memory map partition scheme, according to one embodiment of the invention.

According to embodiments of the invention, the primary components of the invention include a boot up component, referred to herein as the pre-kernel, a resident component, referred to herein as the SYS code, and an enhanced operating system (OS) loader.

The pre-kernel is responsible for specifying the memory map according to a partitioning scheme that enables multiple OSs to exist in memory without modifications to any of the OSs. The pre-kernel also provides for a location to store the SYS code. Such a memory partitioning scheme is described below in conjunction with FIG. 1. In addition, the pre-kernel is responsible for loading the SYS code, which includes the resume hook, loading one or more of the operating systems and OS loaders, and booting the first OS. After control is passed to the initial OS, the pre-kernel can be discarded and/or overwritten. The pre-kernel is loaded by the boot loader and runs before any OS kernels, and can be implemented in any format compatible with the boot loader. There are no other requirements on the boot loader. In one embodiment, the pre-kernel is a multi-boot kernel loaded by the Grand Unified Boot Loader (GRUB).

The SYS code is the resident component of the application and must remain in memory in order to handle the actual switching between the multiple OSs. The primary functions of the SYS code include the memory partition handler and the resume hook, both of which are described below. Different memory partition handlers may be used in different embodiments, depending on the BIOS implemented with a particular computer system. For example, in one embodiment, in which an x86-based computer system is configured with traditional BIOS, the memory partition handler is an INT15 handler. For ease of description, the memory partition handler is described below as an INT15 handler in an exemplary embodiment. However, one of skill in the art, upon reading the disclosure herein, can readily implement embodiments of the invention for an x86-based computer system configured with a different BIOS, such as an extensible firmware interface (EFI) BIOS.

The memory partition handler, referred to in this exemplary embodiment as the INT15 handler, is responsible for providing a memory map to each OS while the OS boots, an example of which is described below in conjunction with FIG. 1. To provide each OS with the requisite memory map, the INT15 handler overrides the INT15 ax=E820 function of the system firmware. This sub-function is how an x86-based OS determines the hardware memory layout when an x86-based computer system is configured with a traditional BIOS. The INT15 ax=E820 must be called in real-mode and is only called during system boot by modern operating systems. In one embodiment, the INT15 handler returns the E820 map for the current OS that was built by the pre-kernel. All other INT15 sub-functions are passed to the system firmware INT15 handler.

The resume hook is a subroutine that is called during the S3 resume path. It is responsible for fixing up the memory layout, determining which OS needs to be run next and then jumping to the OS waking vector. Embodiments of the invention contemplate a number of ways in which the SYS code inserts itself into the resume path, i.e., loads the resume hook. According to one embodiment, the resume hook is loaded by overwriting a portion of the firmware code in the BIOS shadow located in DRAM, which is typically in the physical address range 0xE0000-0xFFFFF. Such an embodiment may be used when BIOS shadow is used on resume, can be performed entirely by the pre-kernel, and does not require any modification to system firmware. According to another embodiment, the resume hook is loaded by overwriting the VGA BIOS initialization routine located at physical address 0xc0003. Such an embodiment can be used when the system calls the VGA BIOS on resume, and which can be performed entirely by the pre-kernel, and does not require any modification to system firmware. In another embodiment, the resume hook is loaded by modifying the resume code in the NVS region. Such an embodiment can be used when there is code in the NVS partition that is in the resume path. In yet another embodiment, the resume hook is loaded by modifying system firmware to specifically call the resume vector.

The enhanced OS loader is responsible for starting a particular OS for the first time. This is done in the same manner [as] a typical boot loader would with the added detail that some hardware must be reinitialized. When the system firmware returns control to the OS on S3 resume, the hardware is typically not in the same state as it would be after a normal POST. The OS loader is responsible for repairing such differences. Examples of differences that may occur on some platforms include initialization of the system timer and setup of the programmable interrupt controller (PIC).

Defining and acting upon the memory map is the main responsibility of the invention. In one embodiment, the user specifies the amount of system memory that each OS is allocated. The typical implementation allows this to be specified on the multi-boot command line. Because the memory map for a x86-based operation system is determined and fixed at boot time, returning the partitioned memory map for the current OS via the INT15 ax=E820 function is mostly sufficient, except for the 0-1 MB RAM region, the remainder of low memory, and the ACPI regions.

Most modern operating systems, including current Windows and Linux, refuse to boot if memory is not available in both the <1 MB RAM region or in the remainder of low memory. The remainder of low memory is the memory starting at 1 MB, and is defined below in conjunction with FIG. 1. As such, there must be E820 entries in each of these regions present in all OS memory maps. To prevent conflicts, i.e., multiple OSs writing to the same memory, embodiments of the invention create shadows of these regions in high memory. When the OS is changed, the contents of these regions are saved to their respective shadows for the current OS and restored for the new OS. In one embodiment, such memory shadowing is implemented for all system memory less than 16 MB, since system memory of 16 MB is sufficient for Windows- and Linux-based operating systems. However, shadowing system memory greater than 16 MB is also contemplated by embodiments of the invention, since the upper bound of the low memory region is implementation dependent.

Similarly, any ACPI regions present on the system must also be shadowed in the same fashion. The ACPI tables found in this region are pointed to by physical address and therefore cannot be moved without modification to the RSDP table and/or NVS regions. Furthermore, the ACPI specification permits the ACPI memory regions to be recycled by the OS. Thus, any ACPI regions present on the system must also be shadowed in order to avoid potentially losing OS-specific data. It can be appreciated that ACPI NVS regions are not—and cannot be—relocated since they contain the FACS table, which in turn contains the ACPI global lock.

FIG. 1 is a graphical representation of a memory map partition scheme 100, according to one embodiment of the invention. Memory map partition scheme 100 is specified by the pre-kernel. As an illustrative example, memory map partition scheme 100 is configured to accommodate a Windows and a Linux OS. One of skill in the art will appreciate that more than two operating systems can be accommodated in a similar fashion, according to embodiments of the invention. Similarly, the operating systems than can benefit from the present invention are not limited to Windows- and Linux-based operating systems.

Memory map partition scheme 100 includes a low memory region 110, a first OS memory partition 120, a second OS memory partition 130, a dedicated memory region, and an ACPI region 170. The dedicated memory region is made up of the different memory regions reserved for use by the code that performs embodiments of the invention, and includes a first OS shadow region 140, a second OS shadow region 150, and a SYS code region 160. As shown, the low memory region 110 includes a first megabyte region 111 and a low memory remainder region 112. First megabyte region 111 includes the 0-1 MB RAM required to be set aside for most modern operating systems. Low memory remainder region 112 includes the memory region starting at 1 MB and extending to an upper bound that depends on the particular embodiment, where a typical value for such an upper bound may be in the 16-128 MB range. It is contemplated that low memory remainder region 112 is not limited in size and may extend beyond 16 MB when necessary for proper operation of a particular OS. First OS memory partition 120 is the memory partition for the first OS, e.g., a Windows-based OS, may be on the order of a few MBs to multiple GBs in size, and is seen as a reserved region, i.e., a do not use region, by the second OS. Second OS memory partition 130 is the memory partition for the second OS, e.g., a Linux-based OS, may be on the order of a few MBs to multiple GBs in size, and is seen as a do not use region by the first OS. First OS shadow region 140 is sized by the pre-kernel to accommodate a shadow of the low memory region 110 and the requisite ACPI regions of the first OS. Second OS shadow region 150 is sized by the pre-kernel to accommodate a shadow of the low memory region 110 and the requisite ACPI regions of the second OS. First OS shadow region 140 and second OS shadow region are both seen as do not use regions of memory by both the first and second OS. SYS code region 160 is sized by the pre-kernel to accommodate the SYS code, and is seen by each OS as a do not use region of memory. In FIG. 1, the location of SYS code region 160 is depicted inside of first megabyte region 111. One of skill in the art will appreciate that in embodiments of the invention directed to an x86-based computer system configured with a traditional BIOS, it may be required to include SYS code region 160 in first megabyte region 111, since the SYS code in such an embodiment may include 16 bit code, such as the INT15 handler. More generally, embodiments of the invention contemplate SYS code region 160 being located anywhere in memory map partition scheme 100 that is unreserved. The term "unreserved," as defined herein, refers to portions of the memory partition for a particular OS that is not labeled as "Reserved," as per the ACPI specification.

Figure 2:
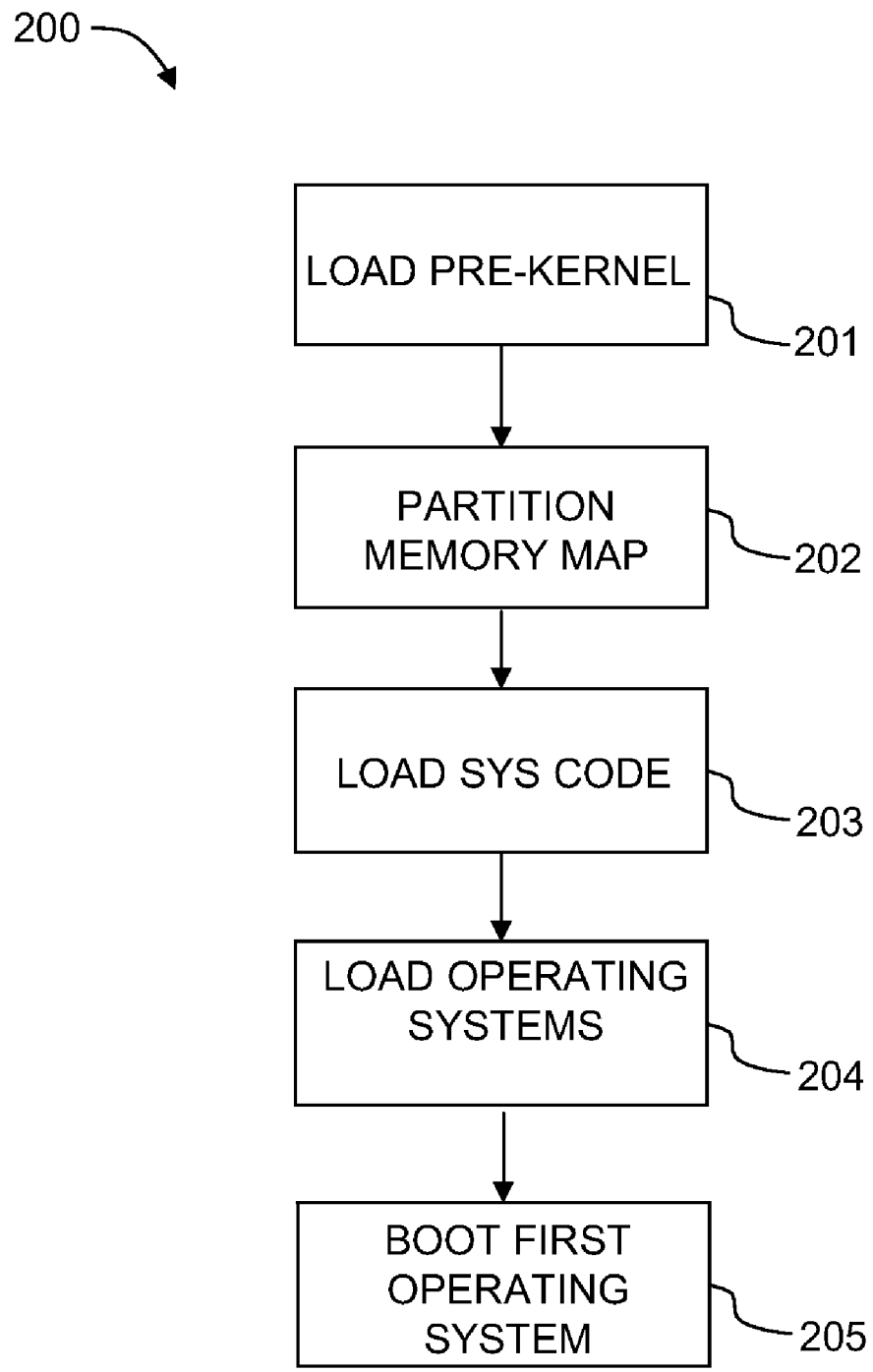
FIG. 2 is a flow chart summarizing a method of configuring an x86-based computer system to run multiple operating systems simultaneously, according to an embodiment of the invention.

FIG. 2 is a flow chart summarizing a method 200 of configuring an x86-based computer system to run multiple operating systems simultaneously, according to an embodiment of the invention. For ease of description, method 200 is described in terms of configuring a system for two operating systems and using a memory map partition substantially similar to memory map partition scheme 100 in FIG. 1. However, configuring a system with more than two OSs and/or using other partition schemes is also contemplated.

In step 201, the pre-kernel is loaded by the boot loader.

In step 202, the pre-kernel partitions the memory map for the system with a low memory region 110, a first OS memory partition 120, a second OS memory partition 130, a first OS shadow region 140, a second OS shadow region 150, a SYS code region 160, and an ACPI region 170. In one embodiment, SYS code region 160 may be located in a portion of the low memory region 110.

In step 203, the pre-kernel loads the SYS code in SYS code region 160 of memory.

In step 204, the pre-kernel load the two operating systems. In one embodiment, the pre-kernel loads the first OS entirely and the second OS entirely. In another embodiment, the pre-kernel loads the first OS entirely and then loads an OS loader capable of loading the second OS. In such an embodiment, the second OS may be loaded at any time after the first OS is loaded.

In step 205, the pre-kernel boots up the first OS and the x86-based computer system begins normal operation.

Figure 3:
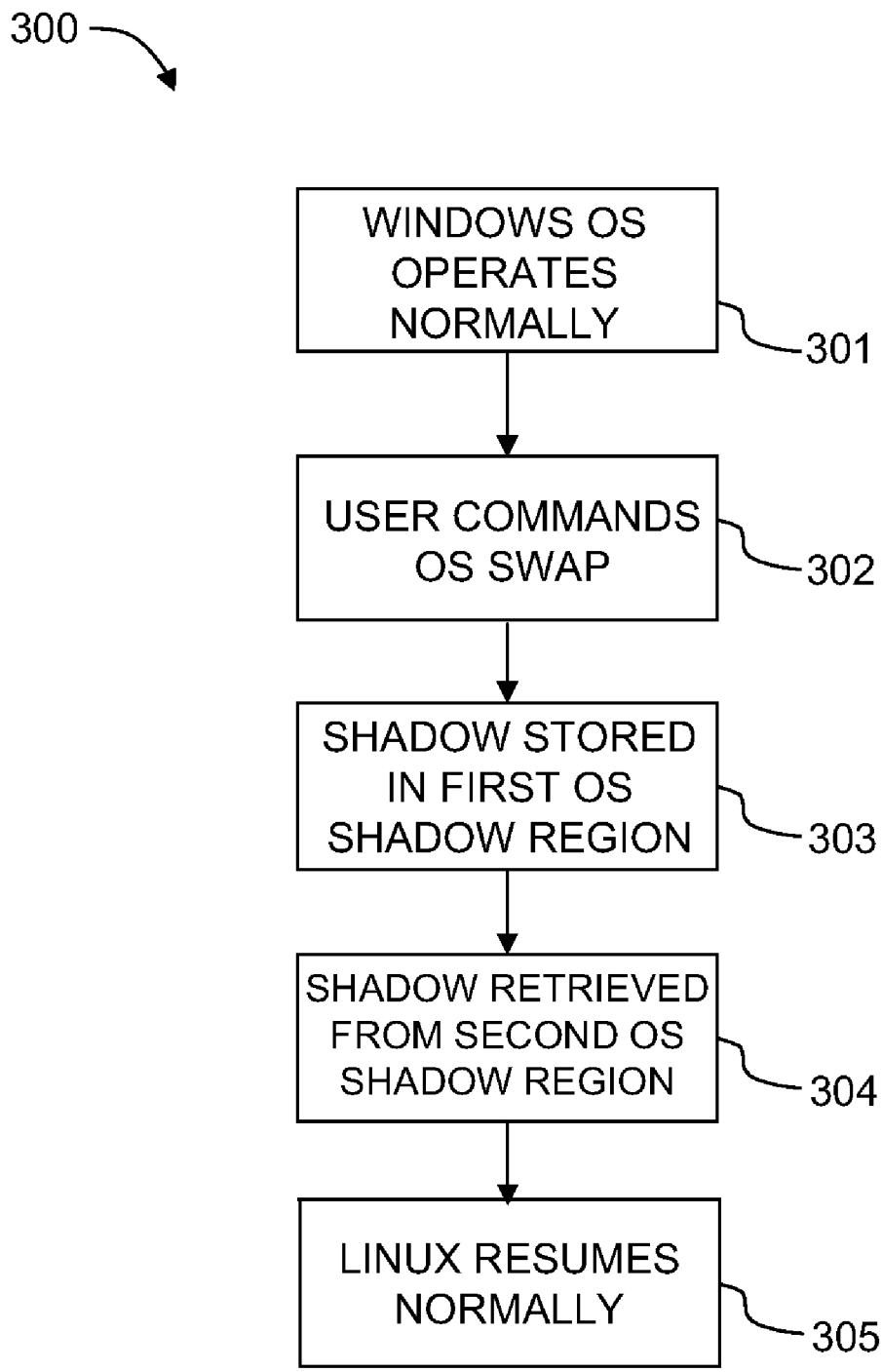
FIG. 3 is a flow chart summarizing a method of running multiple operating systems concurrently on an x86-based computer system, according to an embodiment of the invention.

FIG. 3 is a flow chart summarizing a method 300 of running multiple operating systems concurrently on an x86-based computer system, according to an embodiment of the invention. For ease of description, method 300 is described in terms of running two operating systems: a Windows-based OS and a Linux-based OS. In accordance with an exemplary embodiment, a memory map partition substantially similar to memory map partition scheme 100 in FIG. 1 is assumed. However, it can be appreciated that running more than two OSs and/or using other partition schemes is also contemplated.

In step 301, the Windows OS resides in first OS memory partition 120 and low memory region 110, and is operating normally. A Linux OS resides in second OS memory partition 130 with the remainder of the memory image saved in second OS shadow region 150. In accordance with an embodiment, a low memory remainder region 112 for the Linux OS is stored in a second OS shadow region 150. In addition, the ACPI regions of the Linux OS are stored in second OS shadow region 150. The SYS code resides in SYS code region 160 as loaded by the pre-kernel.

In step 302, a user requests an OS swap from Windows to Linux, i.e., Windows is changed to sleep mode and Linux is resumed.

In step 303, the SYS code inserts itself into the resume path. As noted above, this can be accomplished by a number of methods, including overwriting a portion of the firmware code in the BIOS shadow located in DRAM, overwriting the VGA BIOS initialization routine, modifying the resume code in the NVS region, and modifying system firmware to specifically call the SYS code during the resume path. The SYS code then stores a shadow of the Windows OS memory currently residing in low memory region 110, and ACPI region 170 into first OS shadow region 140. In one embodiment, information located in low memory region 110 that is dedicated to BIOS, e.g., the VGA BIOS, is not included in the shadow of the Windows OS stored in first OS shadow region 140.

In step 304, the SYS code commands that the shadow stored in second OS shadow region 150, which includes a shadow of low memory region 110 for the Linux OS and the ACPI regions of the Linux OS, be placed in low memory region 110. In this way, the Linux OS is able to resume in the same configuration as when the Linux OS was last active.

In step 305, after the state of the Windows OS is saved and the Linux OS state is restored, the system then jumps to the Linux resume vector, which starts the resume process for the Linux OS. The Linux then resumes as normal.

Using a similar procedure, the Linux OS can be swapped with the Windows OS and Windows can be resumed in the same configuration as when Windows was last active. One of skill in the art will appreciate that method 300 allows an x86-based computer system to run multiple operating systems with full access to hardware by either OS, and that such a solution is currently unknown in the art.

Figure 4:
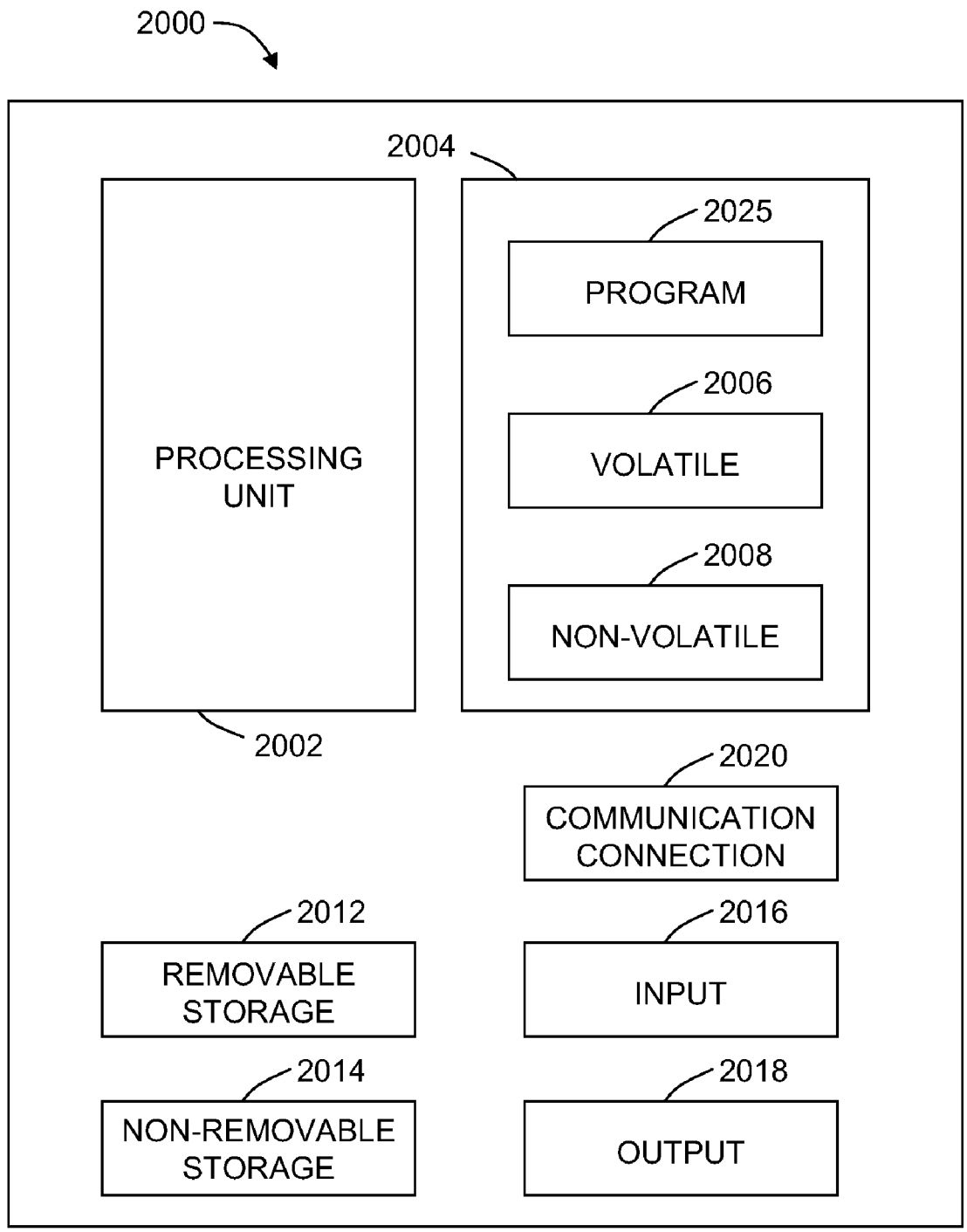
FIG. 4 is a block diagram of an x86-based computer system that benefits from embodiments of the invention and can execute computer program instructions for running multiple operating systems simultaneously.

FIG. 4 is a block diagram of an x86-based computer system 2000 that may benefit from embodiments of the invention and may execute computer program instructions for running multiple operating systems simultaneously. Computer system 2000 includes a processing unit 2002, memory 2004, removable storage 2012, and non-removable storage 2014. Memory 2004 may include volatile memory 2006 and non-volatile memory 2008, either of which may contain some or all of memory map partition scheme 100. Computer system 2000 may include, or have access to a computing environment that includes, a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer system 2000 may include or have access to a computing environment that includes input 2016, output 2018, and a communication connection 2020. One of the inputs could be a keyboard, a mouse, or other selection device. The communication connection 2020 can also include a graphical user interface, such as a display. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executed by the processing unit 2002 of the computer system 2000. A hard drive, CD-ROM, and RAM are some examples of articles including a computer-readable medium. For example, a computer program 2025 capable of providing a generic technique for configuring an x86-based computer system to run multiple operating systems simultaneously and/or for running multiple operating systems simultaneously may be included on a CD-ROM and loaded from the CD-ROM to a hard drive. The computer-readable instructions allow computer system 2000 to provide generic access controls in a COM based computer network system having multiple users and servers.

A machine-readable medium, such as discussed above, provides instructions that, when executed by an x86-based computer system, cause the computer system to load a pre-kernel application, partition the memory map for the computer system to include a low memory region, a first OS memory partition, a second OS memory partition, a first OS shadow region, a second OS shadow region, and a resident component region, load a resident component in the resident component region of the system, load multiple operating systems on the system, and boot up the first OS. Alternatively, a machine-readable medium provides instructions that, when executed by an x86-based computer system, cause the computer system to store in a shadow region a shadow of the contents of a low memory region and the ACPI regions of the current OS, retrieve a shadow of a low memory region and the ACPI regions of a second OS, and resume the second OS.

While the foregoing is directed to embodiments of the present invention, other and further embodiments of the invention may be devised without departing from the basic scope thereof, and the scope thereof is determined by the claims that follow.

What is claimed is:

1. On an x86-based computer system, a method of running multiple operating systems comprising:
   partitioning a memory map on the x86-based computer system, the memory map comprising,
   a first operating system (OS) memory partition,
   a second OS memory partition, and
   a dedicated memory region that is configured as a do not use region by the first OS and the second OS and is sized to store a state of the first OS and a state of the second OS simultaneously,
   loading a first OS in the first OS memory partition;
   loading a second OS in the second OS memory partition; and
   booting up the first and second OSs.

2. The method of claim 1, wherein the dedicated memory region comprises a first OS shadow region, a second OS shadow region, and a SYS code region.

3. The method of claim 2, further comprising storing a shadow of the second OS in the second OS shadow region.

4. The method of claim 3, wherein the memory map further comprises a low memory region and the shadow of the second OS comprises data that resides in the low memory region when the second OS is the active OS.

5. The method of claim 3, wherein the shadow of the second OS comprises data from an ACPI region of the second OS.

6. The method of claim 1, further comprising:
   storing a shadow of the second OS in a second OS shadow region; and
   switching execution from the first OS to the second OS by sleeping the first OS and resuming the second OS using the shadow of the second OS stored in the second OS shadow region.

7. The method of claim 1, wherein the memory map comprises a low memory region and a SYS code region is located in the low memory region.

8. The method of claim 1, further comprising loading a SYS code, wherein the SYS code includes a memory partition handler and a resume hook routine.

9. The method of claim 1, further comprising loading a pre-kernel on the x86-based computer system configured to partition the memory map, loading the first and second OSs, and loading a SYS code that includes a memory partition handler and a resume hook routine.

10. The method of claim 9, wherein loading a second OS in the second OS memory partition comprises loading a boot loader configured to start the second OS.

11. On a single x86-based computer system, a method of running multiple operating systems comprising:
    loading a pre-kernel onto the single x86 based computer system; and
    performing the following steps with the pre-kernel:
    partitioning a memory map that comprises a low memory region, a first operating system (OS) memory partition, a second OS memory partition, and a dedicated memory region that is configured as a do not use region by the first OS and the second OS and is sized to store a state of the first OS and a state of the second OS simultaneously;
    loading a first OS in an unreserved memory region for the first OS;
    loading a second OS in the second OS memory partition; and
    booting up the first OS to begin normal operation of the x86-based computer system.

12. The method of claim 11, wherein the dedicated memory region comprises a first OS shadow region and a second OS shadow region.

13. The method of claim 12, further comprising switching execution from the first OS to the second OS by:
    storing a shadow of the first OS that resides in the first OS shadow region; and restoring a shadow of the second OS from the second OS shadow region.

14. The method of claim 11, wherein the dedicated memory region for the first OS comprises areas of the memory map not labeled Reserved for the first OS, including portions of low memory, the first OS memory partition, and ACPI regions.

15. The method of claim 11, further comprising loading a SYS code, wherein the SYS code includes a memory partition handler and a resume hook routine.

16. The method of claim 11, wherein loading a second OS in the second OS memory partition comprises loading a boot loader using the pre-kernel, wherein the boot loader is configured to start the second OS.

17. The method of claim 11, wherein the shadow of the second OS comprises data that resides in the low memory region when the second OS is the active OS.

18. On a single x86-based computer system with a first operating system residing in a first OS memory partition and a low memory region, a method of running multiple operating systems comprising:
   storing a shadow of the first OS in a first OS shadow region; and
   restoring a shadow of a second OS from a second OS shadow region.

19. The method of claim 18, wherein restoring the shadow of the second OS comprises restoring a portion of the second shadow into the low memory region and a portion of the second shadow into an ACPI region.

20. The method of claim 18, wherein the second OS resides in a second OS memory partition and the second OS shadow region.

21. The method of claim 18, wherein the shadow of the first OS comprises an ACPI region of the first OS.

22. The method of claim 18, wherein the low memory region comprises a 1 MB region and a low memory remainder region.

23. The method of claim 18, wherein a SYS code resides in a SYS code region as loaded by a pre-kernel and includes a memory partition handler and a resume hook routine.

24. The method of claim 23, wherein the SYS code stores a shadow of the first OS currently residing in the first OS shadow region.

25. The method of claim 23, further comprising inserting the SYS code into a resume path.

26. The method of claim 25, wherein inserting the SYS code into the resume path is accomplished by one of: overwriting a portion of the firmware code in the BIOS shadow located in DRAM; overwriting the VGA BIOS initialization routine; modifying the resume code in the NVS region; and modifying system firmware to specifically call the SYS code during the resume path.

27. The method of claim 18, further comprising requesting an OS swap from the first OS to the second OS by changing the first OS to sleep mode and resuming the second OS.

* * * * *